United States Patent
Yu et al.

(10) Patent No.: US 11,229,041 B2
(45) Date of Patent: Jan. 18, 2022

(54) DOWNLINK CONTROL INFORMATION (DCI) TRANSMISSION METHOD, NETWORK DEVICE, AND USER EQUIPMENT

(71) Applicant: HUAWEI TECHNOLOGIES CO., LTD., Guangdong (CN)

(72) Inventors: Zheng Yu, Beijing (CN); Chao Luo, Shenzhen (CN); Xingqing Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/519,318

(22) Filed: Jul. 23, 2019

(65) Prior Publication Data

US 2019/0349971 A1    Nov. 14, 2019

Related U.S. Application Data

(63) Continuation of application No. PCT/CN2017/072215, filed on Jan. 23, 2017.

(51) Int. Cl.
*H04W 72/12* (2009.01)
*H04W 72/04* (2009.01)
(Continued)

(52) U.S. Cl.
CPC ....... *H04W 72/1273* (2013.01); *H04L 1/1812* (2013.01)

(58) Field of Classification Search
None
See application file for complete search history.

(56) References Cited

U.S. PATENT DOCUMENTS

2008/0130548 A1  6/2008 Kaikkonen et al.
2011/0317643 A1  12/2011 Gaal et al.
(Continued)

FOREIGN PATENT DOCUMENTS

CN   101841772 A   9/2010
CN   103125089 A   5/2013
(Continued)

OTHER PUBLICATIONS

Huawei Hisilicon, "SC-MCCH transmission in NB-IoT," 3GPP DRAFT; 3GPP TSG RAN WG1 Meeting #87, R1-1611151, Reno, USA, Nov. 14-18, 2016, XP051175132, 6 pages.
(Continued)

*Primary Examiner* — Scott M Sciacca
(74) *Attorney, Agent, or Firm* — Fish & Richardson P.C.

(57) ABSTRACT

Embodiments of the present invention disclose a downlink control information (DCI) transmission method, a network device, and user equipment. The method includes the following steps: A network device transmits DCI in a first DCI format; when the DCI is used to schedule a physical downlink shared channel (PDSCH) carrying a multicast traffic channel, the network device indicates, by using a first radio network temporary identifier (RNTI), that the DCI is used to schedule the PDSCH carrying the multicast traffic channel, and that first information is indicated in the DCI and second information is not indicated in the DCI; and when the DCI is used to schedule a user equipment-specific (UE-specific) PDSCH, the network device indicates, by using a second RNTI, that the DCI is used to schedule the UE-specific PDSCH, and that the first information is not indicated in the DCI and the second information is indicated in the DCI.

2 Claims, 4 Drawing Sheets

(51) Int. Cl.
*H04L 1/00* (2006.01)
*H04L 1/18* (2006.01)

(56) References Cited

U.S. PATENT DOCUMENTS

| | | | |
|---|---|---|---|
| 2013/0195041 A1* | 8/2013 | Papasakellariou | H04L 1/0038 370/329 |
| 2015/0016312 A1 | 1/2015 | Li et al. | |
| 2016/0270038 A1* | 9/2016 | Papasakellariou | H04L 1/1671 |
| 2017/0019772 A1* | 1/2017 | Kim | H04W 72/005 |
| 2017/0019882 A1 | 1/2017 | Nimbalker et al. | |
| 2019/0045488 A1* | 2/2019 | Park | H04L 5/0048 |
| 2019/0246254 A1* | 8/2019 | Chatterjee | H04L 5/0053 |
| 2020/0008130 A1* | 1/2020 | Yavuz | H04L 5/0053 |

FOREIGN PATENT DOCUMENTS

| | | |
|---|---|---|
| CN | 105379336 A | 3/2016 |
| EP | 2582170 A1 | 4/2013 |
| WO | 2011032035 A2 | 3/2011 |

OTHER PUBLICATIONS

CMCC, "Discussion on DCI in NR," 3GPP DRAFT; 3GPP TSG RAN WG1 NR Ad-Hoc Meeting, R1-1700440, Spokane, USA, Jan. 16-20, 2017, XP051202266, 6 pages.
Ericsson, "NB-IoT Search Space and DCI design for multicast service," 3GPP DRAFT; 3GPP TSG-RAN WG1 #87, R1-1611121, Reno, USA, Nov. 14-18, 2016, XP051175103, 8 pages.
3GPP TS 36.212 V14.1.1 (Jan. 2017), "3rd Generation Partnership Project; Technical Specification Group Radio Access Network; Evolved Universal Terrestrial Radio Access (E-UTRA); Multiplexing and channel coding (Release 14)," Technical Specification, Jan. 2017, 149 pages.
3GPP TS 36.331 V14.1.0 (Dec. 2016), "3rd Generation Partnership Project; Technical Specification Group Radio Access Network; Evolved Universal Terrestrial Radio Access (E-UTRA); Radio Resource Control (RRC); Protocol specification (Release 14)," Dec. 2016, 653 pages.
3GPP TS 36.213 V14.1.0 (Dec. 2016), "3rd Generation Partnership Project; Technical Specification Group Radio Access Network; Evolved Universal Terrestrial Radio Access (E-UTRA); Physical layer procedures(Release 14)," Dec. 2016, 414 pages.
Extended European Search Report issued in European Application No. 17893391.7 dated Nov. 19, 2019, 10 pages.
PCT International Search Report and Written Opinion issued in International Application No. PCT/CN2017/072215 dated May 26, 2017, 18 pages (with English translation).
Huawei, "Introduction of Rel-14 NB-IoT enhancements in 36.212," 3GPP TSG RAN WG1 Meeting #88, R1-1704148, Athens, Greece, Feb. 13-17, 2017, 3 pages.
Huawei, HiSilicon, "NPDCCH search space and DCI formats for multicast in NB-IoT," 3GPP TSG RAN WG1 Meeting #87, R1-1611150, Reno, USA, Nov. 14-18, 2016, 6 pages.
Huawei et al. "Way Forward for Change notification of SC-MCCH (For UEs with on-going service)," R2-168980, Nov. 18, 2016, 3 pages.
LG Electronics, "Multicast support for eNB-IoT," 3GPP TSG RAN WG1 Meeting #86, R1-167877, Gothenburg, Sweden, Aug. 22-26, 2016, 4 pages.
Motorola Mobility, "Introduction of NB-IoT," 3GPP TSG-RAN1 Meeting #85, R1-165972, Nanjing, China, May 23-27, 2016, 20 pages.
Office Action issued in Japanese Application No. 2019-539834 dated Oct. 19, 2020, 9 pages (with English translation).
TSG RAN WG1, "Introduction of Rel-13 NB-IoT feature to LTE RAN1specs," 3GPP TSG RAN Meeting #72, RP-161067, Busan, Korea, Jun. 13-16, 2016, 49 pages.
Office Action issued in Indian Application No. 201917029808 dated Jan. 28, 2021, 6 pages.
Office Action issued in Chinese Application No. 201780084179.5 dated Dec. 1, 2020, 9 pages.

\* cited by examiner

DOWNLINK CONTROL INFORMATION (DCI) TRANSMISSION METHOD, NETWORK DEVICE, AND USER EQUIPMENT

CROSS-REFERENCE TO RELATED APPLICATIONS

This application is a continuation of International Application No. PCT/CN2017/072215, filed on Jan. 23, 2017, the disclosure of which is hereby incorporated by reference in its entirety.

TECHNICAL FIELD

This application relates to the field of communications technologies, and in particular, to a downlink control information (DCI) transmission method, a network device, and user equipment.

BACKGROUND

With the rapid development of Internet of Things technologies, a large quantity of machine-type communications devices are being deployed in a network. The network usually requires software upgrade. Such software upgrade requires a plurality of users to receive same data at the same time. To effectively use mobile network resources, the 3rd Generation Partnership Project (3GPP) proposes a Multimedia Broadcast Multicast Service (MBMS). The MBMS is a technology for transmitting data from one data source to a plurality of target mobile terminals, to implement a resource sharing function and improve resource utilization. A point to multipoint (PTM) transmission manner may be used for existing MBMS data, and a multicast control channel (MCCH) and a multicast traffic channel (MTCH) are used in the PTM transmission manner. In actual communication, when the MTCH is being scheduled, indication information indicating whether a configuration of the MTCH changes in a next modification period and indication information indicating whether a new service starts in the next modification period need to be added. In an existing technical solution, 2 bits are added to downlink control information (DCI) to implement this. Specifically, 1 bit is used to indicate whether a configuration of the MTCH changes in a next modification period, and the other bit is used to indicate whether a new service starts on the MTCH in the next modification period. However, this increases bit overheads of the DCI, and reduces control channel transmission performance.

SUMMARY

Embodiments of the present application provide a downlink control information (DCI) transmission method, a network device, and user equipment. In this way, an indication indicating that configuration information of an MTCH changes is implemented in DCI without adding a bit to the DCI, so that control channel transmission performance is improved.

According to a first aspect, an embodiment of the present invention provides a downlink control information (DCI) transmission method, including:

transmitting, by a network device, DCI in a first DCI format; when the DCI is used to schedule a physical downlink shared channel (PDSCH) carrying a multicast traffic channel, indicating, by the network device by using a first radio network temporary identifier (RNTI), that the DCI is used to schedule the PDSCH carrying the multicast traffic channel, and that first information is indicated in the DCI and second information is not indicated in the DCI; and when the DCI is used to schedule a user equipment-specific (UE-specific) PDSCH, indicating, by the network device by using a second RNTI, that the DCI is used to schedule the UE-specific PDSCH, and that the first information is not indicated in the DCI and the second information is indicated in the DCI.

In the first aspect, the network device transmits the DCI in the first DCI format. In this way, when the DCI is used to schedule different PDSCHs, information that needs to be indicated in the DCI is different from information that does not need to be indicated in the DCI, and the information that needs to be indicated can be transmitted without increasing a quantity of bits, thereby improving control channel transmission performance.

In a possible embodiment, when the DCI is used to schedule a PDSCH carrying a random access response message, the network device indicates, by using a third RNTI, that the DCI is used to schedule the PDSCH carrying the random access response message, and that neither the first information nor the second information is indicated in the DCI.

In a possible embodiment, a size of the first information is 1 bit, and the first information is used to indicate whether a configuration of the multicast traffic channel changes in a next modification period; or a size of the first information is 1 bit, and the first information is used to indicate whether a new service starts on the multicast traffic channel in a next modification period; or the first information includes only third information and fourth information, a size of the third information is 1 bit, a size of the fourth information is 1 bit, the third information is used to indicate whether a configuration of the multicast traffic channel changes in a next modification period, and the fourth information is used to indicate whether a new service starts on the multicast traffic channel in the next modification period; or a size of the first information is 2 bits, and the 2 bits of the first information are used to jointly indicate whether a configuration of the multicast traffic channel changes in a next modification period, and whether a new service starts on the multicast traffic channel in the next modification period.

In a possible embodiment, the DCI includes a first field or a second field; and when the DCI is used to schedule a PDSCH carrying a multicast traffic channel, the DCI includes the first field and does not include the second field; or when the DCI is used to schedule a UE-specific PDSCH, the DCI includes the second field and does not include the first field, where the first field is used to indicate the first information, and the second field is used to indicate the second information.

In a possible embodiment, a bit position, in the DCI, of a bit included in the first field is the same as a bit position, in the DCI, of a bit included in the second field.

In a possible embodiment, when the first information includes only the third information and the fourth information, the first field includes a third field and a fourth field, where the third field is used to indicate the third information, and the fourth field is used to indicate the fourth information.

In a possible embodiment, the DCI includes a fifth field; and when the DCI is used to schedule a PDSCH carrying a multicast traffic channel, the fifth field is used to indicate the first information; or when the DCI is used to schedule a UE-specific PDSCH, the fifth field is used to indicate the second information; or when the DCI is used to schedule a PDSCH carrying a random access response message, a bit of the fifth field is a reserved bit.

In a possible embodiment, the second information is a hybrid automatic repeat request-acknowledgment resource offset (HARQ-ACK resource offset); or the second information is a new data indicator (NDI); or the second information is transmit power control (TPC); or the second information is a hybrid automatic repeat request process number (HARQ process number).

In a possible embodiment, the fifth field is a field used to indicate the second information.

According to a second aspect, an embodiment of the present invention provides a downlink control information (DCI) transmission method, including:

receiving, by user equipment, DCI in a first DCI format, where when a cyclic redundancy code (CRC) of the received DCI is scrambled by using a first radio network temporary identifier (RNTI), the DCI is used to schedule a physical downlink shared channel (PDSCH) carrying a multicast traffic channel, and first information is indicated in the DCI and second information is not indicated in the DCI; and when the CRC of the received DCI is scrambled by using a second RNTI, the DCI is used to schedule a user equipment-specific (UE-specific) PDSCH, and the first information is not indicated in the DCI and the second information is indicated in the DCI.

In the second aspect, the user equipment receives the DCI in the first DCI format. In this way, when the DCI is used to schedule different PDSCHs, information that needs to be indicated in the DCI is different from information that does not need to be indicated in the DCI, and the information that needs to be indicated can be transmitted without increasing a quantity of bits, thereby improving control channel transmission performance.

In a possible embodiment, when the CRC of the received DCI is scrambled by using a third RNTI, the DCI is used to schedule a PDSCH carrying a random access response message, and neither the first information nor the second information is indicated in the DCI.

In a possible embodiment, a size of the first information is 1 bit, and the first information is used to indicate whether a configuration of the multicast traffic channel changes in a next modification period; or a size of the first information is 1 bit, and the first information is used to indicate whether a new service starts on the multicast traffic channel in a next modification period; or the first information includes only third information and fourth information, a size of the third information is 1 bit, a size of the fourth information is 1 bit, the third information is used to indicate whether a configuration of the multicast traffic channel changes in a next modification period, and the fourth information is used to indicate whether a new service starts on the multicast traffic channel in the next modification period; or a size of the first information is 2 bits, and the 2 bits of the first information are used to jointly indicate whether a configuration of the multicast traffic channel changes in a next modification period, and whether a new service starts on the multicast traffic channel in the next modification period.

In a possible embodiment, the DCI includes a first field or a second field; and when the DCI is used to schedule a PDSCH carrying a multicast traffic channel, the DCI includes the first field and does not include the second field; or when the DCI is used to schedule a UE-specific PDSCH, the DCI includes the second field and does not include the first field, where the first field is used to indicate the first information, and the second field is used to indicate the second information.

In a possible embodiment, a bit position, in the DCI, of a bit included in the first field is the same as a bit position, in the DCI, of a bit included in the second field.

In a possible embodiment, when the first information includes only the third information and the fourth information, the first field includes a third field and a fourth field, where the third field is used to indicate the third information, and the fourth field is used to indicate the fourth information.

In a possible embodiment, the DCI includes a fifth field; and when the DCI is used to schedule a PDSCH carrying a multicast traffic channel, the fifth field is used to indicate the first information; or when the DCI is used to schedule a UE-specific PDSCH, the fifth field is used to indicate the second information; or when the DCI is used to schedule a PDSCH carrying a random access response message, a bit of the fifth field is a reserved bit.

In a possible embodiment, the second information is a hybrid automatic repeat request-acknowledgment resource offset (HARQ-ACK resource offset); or the second information is a new data indicator (NDI); or the second information is transmit power control (TPC); or the second information is a hybrid automatic repeat request process number (HARQ process number).

In a possible embodiment, the fifth field is a field used to indicate the second information.

According to a third aspect, an embodiment of the present invention provides a network device, including a transmission module and an indication module.

The transmission module is configured to transmit DCI in a first DCI format.

The indication module is configured to: when the DCI is used to schedule a physical downlink shared channel (PDSCH) carrying a multicast traffic channel, indicate, by using a first radio network temporary identifier (RNTI), that the DCI is used to schedule the PDSCH carrying the multicast traffic channel, and that first information is indicated in the DCI and second information is not indicated in the DCI.

The indication module is further configured to: when the DCI is used to schedule a user equipment-specific (UE-specific) PDSCH, indicate, by using a second RNTI, that the DCI is used to schedule the UE-specific PDSCH, and that the first information is not indicated in the DCI and the second information is indicated in the DCI.

In the third aspect, the network device transmits the DCI in the first DCI format. In this way, when the DCI is used to schedule different PDSCHs, information that needs to be indicated in the DCI is different from information that does not need to be indicated in the DCI, and the information that needs to be indicated can be transmitted without increasing a quantity of bits, thereby improving control channel transmission performance.

In an optional embodiment, the indication module is further configured to: when the DCI is used to schedule a PDSCH carrying a random access response message, indicate, by using a third RNTI, that the DCI is used to schedule the PDSCH carrying the random access response message, and that neither the first information nor the second information is indicated in the DCI.

In an optional embodiment, a size of the first information is 1 bit, and the first information is used to indicate whether a configuration of the multicast traffic channel changes in a next modification period; or a size of the first information is 1 bit, and the first information is used to indicate whether a new service starts on the multicast traffic channel in a next modification period; or the first information includes only third information and fourth information, a size of the third information is 1 bit, a size of the fourth information is 1 bit, the third information is used to indicate whether a configuration of the multicast traffic channel changes in a next modification period, and the fourth information is used to indicate whether a new service starts on the multicast traffic channel in the next modification period; or a size of the first information is 2 bits, and the 2 bits of the first information are used to jointly indicate whether a configuration of the multicast traffic channel changes in a next modification period, and whether a new service starts on the multicast traffic channel in the next modification period.

In an optional embodiment, the DCI includes a first field or a second field; and when the DCI is used to schedule a PDSCH carrying a multicast traffic channel, the DCI includes the first field and does not include the second field; or when the DCI is used to schedule a UE-specific PDSCH, the DCI includes the second field and does not include the first field, where the first field is used to indicate the first information, and the second field is used to indicate the second information.

In an optional embodiment, a bit position, in the DCI, of a bit included in the first field is the same as a bit position, in the DCI, of a bit included in the second field.

In an optional embodiment, when the first information includes only the third information and the fourth information, the first field includes a third field and a fourth field, where the third field is used to indicate the third information, and the fourth field is used to indicate the fourth information.

In an optional embodiment, the DCI includes a fifth field; and when the DCI is used to schedule a PDSCH carrying a multicast traffic channel, the fifth field is used to indicate the first information; or when the DCI is used to schedule a UE-specific PDSCH, the fifth field is used to indicate the second information; or when the DCI is used to schedule a PDSCH carrying a random access response message, a bit of the fifth field is a reserved bit.

In an optional embodiment, the second information is a hybrid automatic repeat request-acknowledgment resource offset (HARQ-ACK resource offset); or the second information is a new data indicator (NDI); or the second information is transmit power control (TPC); or the second information is a hybrid automatic repeat request process number (HARQ process number).

In an optional embodiment, the fifth field is a field used to indicate the second information.

In a possible design, a structure of the network device includes a processor and a transceiver, where the transceiver is communicatively connected to the processor, and the processor is configured to execute the downlink control information transmission method provided in the first aspect of this application. Optionally, the structure may further include a memory, where the memory is configured to store application program code that supports the network device in performing the foregoing method, and the processor is configured to execute the application program code stored in the memory.

According to a fourth aspect, an embodiment of the present invention provides user equipment, including a receiving module and a determining module.

The receiving module is configured to receive DCI in a first DCI format.

The determining module is configured to: when a cyclic redundancy code (CRC) of the received DCI is scrambled by using a first radio network temporary identifier (RNTI), determine that the DCI is used to schedule a physical downlink shared channel (PDSCH) carrying a multicast traffic channel, and that first information is indicated in the DCI and second information is not indicated in the DCI.

The determining module is further configured to: when the CRC of the received DCI is scrambled by using a second RNTI, determine that the DCI is used to schedule a user equipment-specific (UE-specific) PDSCH, and that the first information is not indicated in the DCI and the second information is indicated in the DCI.

In the fourth aspect, the user equipment receives the DCI in the first DCI format. In this way, when the DCI is used to schedule different PDSCHs, information that needs to be indicated in the DCI is different from information that does not need to be indicated in the DCI, and the information that needs to be indicated can be transmitted without increasing a quantity of bits, thereby improving control channel transmission performance.

In an optional embodiment, the determining module is further configured to: when the CRC of the received DCI is scrambled by using a third RNTI, determine that the DCI is used to schedule a PDSCH carrying a random access response message, and that neither the first information nor the second information is indicated in the DCI.

In an optional embodiment, a size of the first information is 1 bit, and the first information is used to indicate whether a configuration of the multicast traffic channel changes in a next modification period; or a size of the first information is 1 bit, and the first information is used to indicate whether a new service starts on the multicast traffic channel in a next modification period; or the first information includes only third information and fourth information, a size of the third information is 1 bit, a size of the fourth information is 1 bit, the third information is used to indicate whether a configuration of the multicast traffic channel changes in a next modification period, and the fourth information is used to indicate whether a new service starts on the multicast traffic channel in the next modification period; or a size of the first information is 2 bits, and the 2 bits of the first information are used to jointly indicate whether a configuration of the multicast traffic channel changes in a next modification period, and whether a new service starts on the multicast traffic channel in the next modification period.

In an optional embodiment, the DCI includes a first field or a second field; and when the DCI is used to schedule a PDSCH carrying a multicast traffic channel, the DCI includes the first field and does not include the second field; or when the DCI is used to schedule a UE-specific PDSCH, the DCI includes the second field and does not include the first field, where the first field is used to indicate the first information, and the second field is used to indicate the second information.

In an optional embodiment, a bit position, in the DCI, of a bit included in the first field is the same as a bit position, in the DCI, of a bit included in the second field.

In an optional embodiment, when the first information includes only the third information and the fourth information, the first field includes a third field and a fourth field, where the third field is used to indicate the third information, and the fourth field is used to indicate the fourth information.

In an optional embodiment, the DCI includes a fifth field; and when the DCI is used to schedule a PDSCH carrying a multicast traffic channel, the fifth field is used to indicate the first information; or when the DCI is used to schedule a UE-specific PDSCH, the fifth field is used to indicate the second information; or when the DCI is used to schedule a PDSCH carrying a random access response message, a bit of the fifth field is a reserved bit.

In an optional embodiment, the second information is a hybrid automatic repeat request-acknowledgment resource offset (HARQ-ACK resource offset); or the second information is a new data indicator (NDI); or the second information is transmit power control (TPC); or the second information is a hybrid automatic repeat request process number (HARQ process number).

In an optional embodiment, the fifth field is a field used to indicate the second information.

In a possible design, a structure of the user equipment includes a processor and a transceiver, where the transceiver is communicatively connected to the processor, and the processor is configured to execute the method provided in the second aspect of this application. Optionally, the structure may further include a memory, where the memory is configured to store application program code that supports the user equipment in performing the foregoing method, and the processor is configured to execute the application program code stored in the memory.

According to a fifth aspect, an embodiment of the present invention provides a computer storage medium, configured to store computer software instructions used by the foregoing network device, where the computer software instructions include a program designed for executing the foregoing aspect.

According to a sixth aspect, an embodiment of the present invention provides a computer storage medium, configured to store computer software instructions used by the foregoing user equipment, where the computer software instructions include a program designed for executing the foregoing aspect.

In the embodiments of the present invention, names of the network device and the user equipment constitute no limitation on the devices. In actual implementation, these devices may appear in other names, provided that functions of the devices are similar to those in this application and fall within the scope of the claims in this application and their equivalent technologies.

In the embodiments of the present invention, when the DCI is used to schedule different PDSCHs, information that needs to be indicated in the DCI is different from information that does not need to be indicated in the DCI, and the information that needs to be indicated can be transmitted without increasing a quantity of bits, thereby improving control channel transmission performance.

BRIEF DESCRIPTION OF DRAWINGS

To describe the technical solutions in the embodiments of the present invention or in the BACKGROUND more clearly, the following briefly describes the accompanying drawings required for describing the embodiments of the present invention or the BACKGROUND.

DESCRIPTION OF EMBODIMENTS

The following describes the embodiments of the present invention with reference to the accompanying drawings in the embodiments of the present invention.

Figure 1:
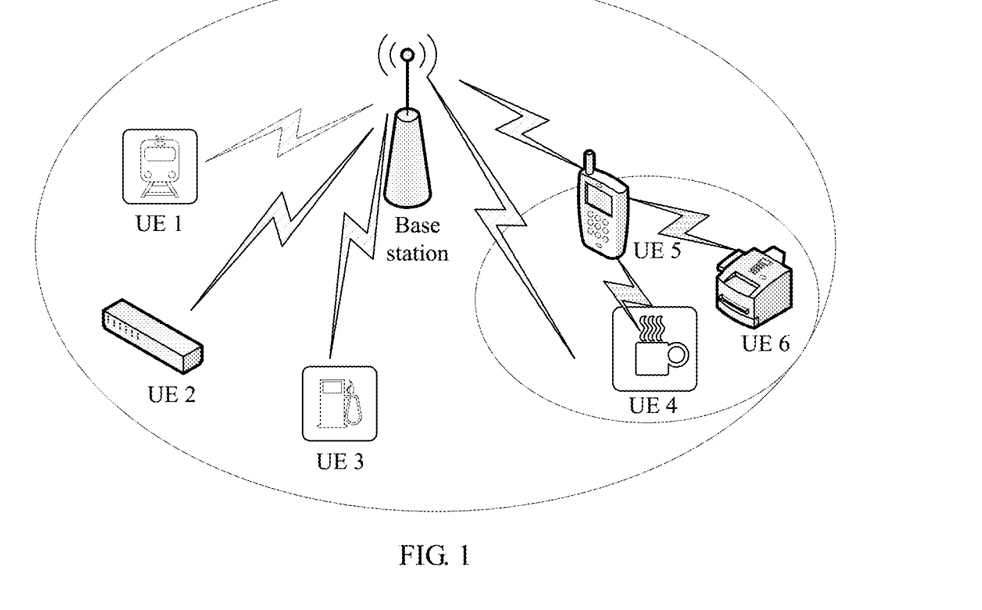
FIG. 1 is a diagram of a possible network architecture according to an embodiment of the present invention.

FIG. 1 is a diagram of a possible network architecture according to an embodiment of the present invention. As shown in FIG. 1, the network architectural includes a base station (BS) and a plurality of user equipments (UE), for example, UE 1, UE 2, . . . , and UE 6. The base station and the UE 1 to the UE 6 form a communications system, and the base station may send a scheduling message to one or more of the UE 1 to the UE 6. In addition, the UE 4 to the UE 6 may also form a communications system, and in this communications system, the UE 5 may send scheduling information to one or more of the UE 4 and the UE 6.

A multimedia broadcast multicast service (MBMS) is a technology for transmitting data from one data source to a plurality of target mobile terminals, to effectively utilize a mobile network resource.

A point to multipoint (PTM) transmission manner is used for the existing multimedia broadcast multicast service. In the existing PTM, some configuration information of an MCCH is indicated by using a system information block (SIB), for example, a SIB 20. UE receives the MCCH based on a configuration of the SIB 20. Specifically, the UE first receives, based on the configuration of the SIB 20, a physical downlink control channel (PDCCH) used for scheduling a physical downlink shared channel (PDSCH). The PDSCH carries the MCCH. After successfully detecting the PDCCH, the UE further detects a data channel that carries the MCCH. After the UE successfully detects the data channel that carries the MCCH, the UE learns of configuration information that is of an MTCH and that is indicated by the MCCH. Then, the UE detects a control channel used for scheduling the PDSCH, where the PDSCH carries the MTCH. After successfully detecting the control channel, the UE further detects a data channel that carries the MTCH. Because the MTCH indicates multicast information, the base station performs multicast communication with the UE through the MTCH.

In actual communication, the configuration of the MTCH may change. For example, the configuration of the MTCH may change in a next modification period, and a new service may start in the next modification period. In the prior art, an additional bit is added to downlink control information (DCI) used for scheduling an MTCH, to indicate whether a configuration of the MTCH changes in a next modification period, and another additional bit is added to indicate whether a new service starts in the next modification period. However, this increases bit overheads of the DCI, and reduces control channel transmission performance. In the embodiments of the present invention, DCI is transmitted in a first DCI format; and when the DCI is used to schedule a physical downlink shared channel (PDSCH) carrying a multicast traffic channel, a first radio network temporary identifier (RNTI) is used to indicate that the DCI is used to schedule the PDSCH carrying the multicast traffic channel, and that first information is indicated in the DCI and second information is not indicated in the DCI; and when the DCI is used to schedule a user equipment-specific (UE-specific) PDSCH, a second RNTI is used to indicate that the DCI is used to schedule the UE-specific PDSCH, and that the first information is not indicated in the DCI and the second information is indicated in the DCI. In this way, an indication indicating that configuration information of an MTCH changes is implemented in DCI without adding a bit to the DCI, so that control channel transmission performance is improved.

In the specification, claims, and accompanying drawings of this application, the terms "first", "second", "third", "fourth", and the like are intended to distinguish between different objects but do not indicate a particular order. In addition, the terms "including", "having", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

The embodiments of the present invention may be applied to another communications system in which DCI needs to be generated and transmitted, for example: an evolved packet system (EPS), a Global System for Mobile Communications (GSM), a Code Division Multiple Access (CDMA) system, a Wideband Code Division Multiple Access (WCDMA) system, a general packet radio service (GPRS) system, an LTE frequency division duplex (FDD) system, or an LTE time division duplex (TDD) system.

In the embodiments of the present invention, user equipment may include but is not limited to a terminal, a mobile station (MS), and the like; or may be a mobile phone (or referred to as a "cellular" phone); or may be a portable, pocket-sized, handheld, computer built-in, or in-vehicle mobile apparatus (a smart band, a smartwatch, smart glasses, or the like).

Based on the network architecture shown in FIG. 1, a network device and user equipment in the embodiments of the present invention may appear in other names, provided that functions of the devices are similar to those in the present invention and fall within the scope of the claims and their equivalent technologies in the present invention.

Figure 2:
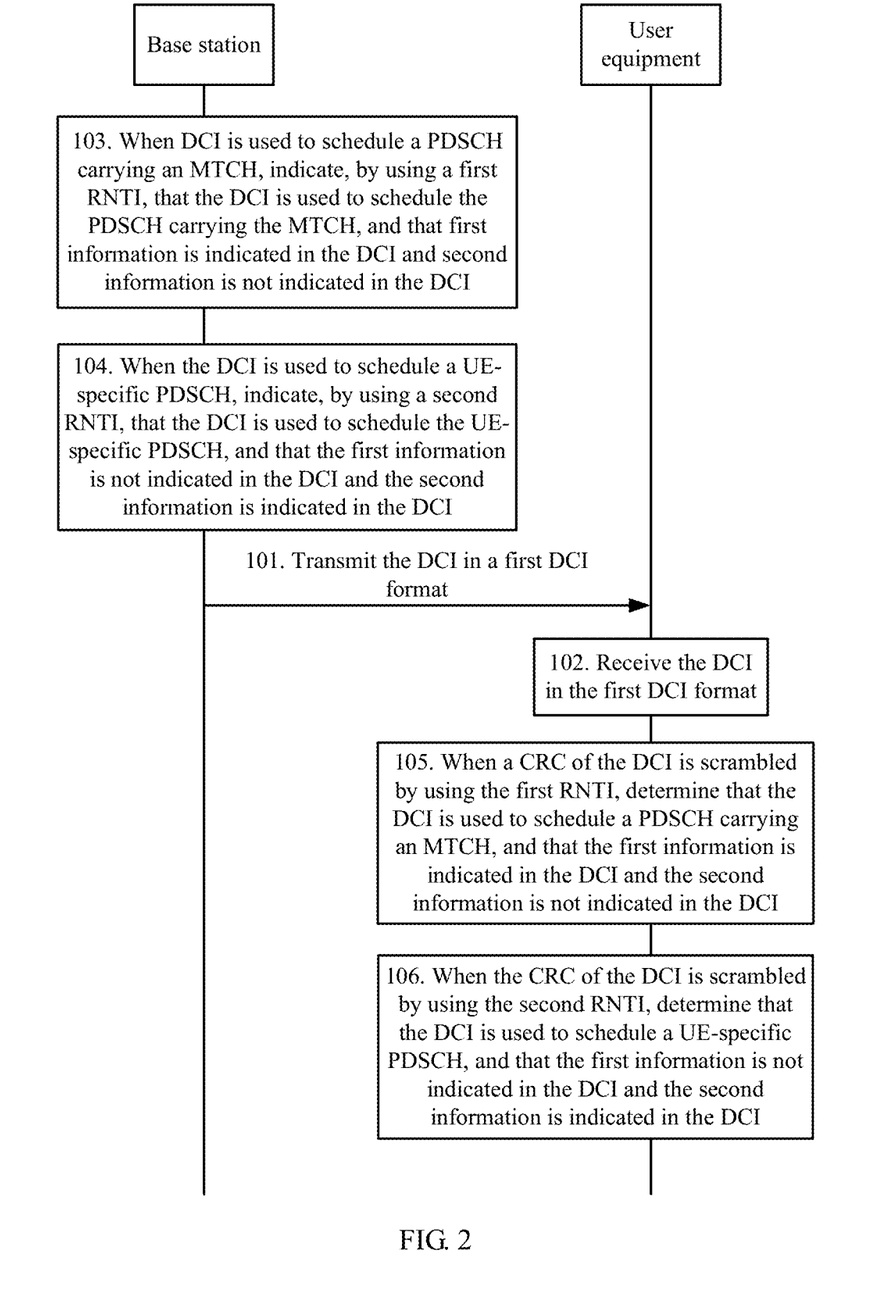
FIG. 2 is a schematic flowchart of a downlink control information (DCI) transmission method according to an embodiment of the present invention.

FIG. 2 is a schematic flowchart of a downlink control information (DCI) transmission method according to an embodiment of the present invention. As shown in FIG. 2, the DCI transmission method in this embodiment of the present invention is performed by both user equipment and a network device such as a base station. For a specific process, refer to the following detailed descriptions.

101. The base station transmits DCI in a first DCI format.

Specifically, the first DCI format may be an existing DCI format. For example, the first DCI format is a DCI format 6-1A or a DCI format 6-1B. Alternatively, the first DCI format is a newly defined DCI format. For example, the first DCI format is a DCI format 6-3A, a DCI format 6-3B, a DCI format 7-1A, or a DCI format 7-1B. This is not limited in this embodiment of the present invention.

Further, the DCI in the first DCI format may be used to schedule a plurality of PDSCHs. For example, the DCI is used to schedule a PDSCH carrying a multicast traffic channel (MTCH); or the DCI is used to schedule a user equipment-specific PDSCH; or the DCI is used to schedule a PDSCH carrying a random access response message. The base station may indicate, by using different radio network temporary identifiers (RNTI), that the DCI is used to schedule different PDSCHs. Specifically, the base station scrambles cyclic redundancy code (CRC) of the DCI by using different RNTIs, to schedule different PDSCHs.

For example, in step 103, if the DCI is used to schedule a PDSCH carrying an MTCH, the base station may indicate, by using a first RNTI, that the DCI is used to schedule the PDSCH carrying the MTCH. In this case, first information is indicated and second information is not indicated in the DCI. For example, in step 104, if the DCI is used to schedule a user equipment-specific PDSCH, the base station may indicate, by using a second RNTI, that the DCI is used to schedule the UE-specific PDSCH. In this case, the second information is indicated and the first information is not indicated in the DCI.

Optionally, if the DCI is used to schedule a PDSCH carrying a random access response message, the base station may indicate, by using a third RNTI, that the DCI is used to schedule the PDSCH carrying the random access response message. In this case, neither the first information nor the second information is indicated in the DCI.

The first information is information used to indicate whether the MTCH changes. For example, the first information is used to indicate at least one of the following: whether a configuration of the MTCH changes in a next modification period, or whether a new service starts on the MTCH in the next modification period. Optionally, the first information may occupy 1 bit or 2 bits in the DCI.

In a possible embodiment, a size of the first information is 1 bit, and the first information is used to indicate whether a configuration of the MTCH changes in a next modification period. Specifically, when a status of a bit of the first information is 0, it indicates that the configuration of the MTCH remains unchanged in the next modification period; and when the status of the bit of the first information is 1, it indicates that the configuration of the MTCH changes in the next modification period. Alternatively, when a status of a bit of the first information is 1, it indicates that the configuration of the MTCH remains unchanged in the next modification period; and when the status of the bit of the first information is 0, it indicates that the configuration of the MTCH changes in the next modification period.

In a possible embodiment, a size of the first information is 1 bit, and the first information is used to indicate whether a new service starts on the MTCH in a next modification period. Specifically, when a status of a bit of the first information is 0, it indicates that a new service starts on the MTCH in the next modification period; and when the status of the bit of the first information is 1, it indicates that no new service starts on the MTCH in the next modification period. Alternatively, when a status of a bit of the first information is 1, it indicates that a new service starts on the MTCH in the next modification period; and when the status of the bit of the first information is 0, it indicates that no new service starts on the MTCH in the next modification period.

In a possible embodiment, a size of the first information is 2 bits, the first information includes only third information and fourth information, a size of the third information is 1 bit, and a size of the fourth information is 1 bit. The third information is used to indicate whether a configuration of the MTCH changes in a next modification period. The fourth information is used to indicate whether a new service starts on the MTCH in the next modification period. For the third information, when a status of a bit of the third information is 0, it indicates that the configuration of the MTCH remains unchanged in the next modification period; and when the status of the bit of the third information is 1, it indicates that the configuration of the MTCH changes in the next modification period. Alternatively, when a status of a bit of the third information is 1, it indicates that the configuration of the MTCH remains unchanged in the next modification period; and when the status of the bit of the third information is 0, it indicates that the configuration of the MTCH changes in the next modification period. For the fourth information, when a status of a bit of the fourth information is 0, it indicates that a new service starts on the MTCH in the next modification period; and when the status of the bit of the fourth information is 1, it indicates that no new service starts on the MTCH in the next modification period. Alternatively, when a status of a bit of the fourth information is 1, it indicates that a new service starts on the MTCH in the next modification period; and when the status of the bit of the fourth information is 0, it indicates that no new service starts on the MTCH in the next modification period.

In a possible embodiment, a size of the first information is 2 bits, and the 2 bits of the first information are used to jointly indicate whether a configuration of the MTCH changes in a next modification period, and whether a new service starts on the MTCH in the next modification period. For example, the 2 bits correspond to four states, such as 00, 01, 10, and 11. The four states respectively correspond to different information. Table 1 below shows a possible correspondence. Another possible correspondence is not limited in this embodiment of the present invention.

TABLE 1

| State | Description |
| --- | --- |
| 00 | A configuration of an MTCH remains unchanged in a next modification period, and no new service starts on the MTCH in the next modification period. |
| 01 | A configuration of an MTCH changes in a next modification period, and no new service starts on the MTCH in the next modification period. |
| 10 | A configuration of an MTCH remains unchanged in a next modification period, and a new service starts on the MTCH in the next modification period. |
| 11 | A configuration of an MTCH changes in a next modification period, and a new service starts on the MTCH in the next modification period. |

Further, it should be noted that, in this embodiment of the present invention, when the DCI is used to schedule different PDSCHs, information that needs to be indicated in the DCI is different from information that does not need to be indicated in the DCI. A quantity of bits in the DCI that can still be used is determined by using the information that does not need to be indicated, and the corresponding quantity of bits are used to indicate the information that needs to be indicated. In this way, the information that needs to be indicated can be transmitted without increasing a quantity of bits, thereby improving control channel transmission performance.

Based on such considerations, when the first information is indicated in the DCI, the second information that does not need to be indicated in the DCI may include but is not limited to any one of a hybrid automatic repeat request-acknowledgment resource offset (HARQ-ACK resource offset), a new data indicator (NDI), transmit power control (TPC), and a hybrid automatic repeat request process number (HARQ process number). A HARQ is a hybrid automatic repeat request. For details, refer to the following analysis.

In a possible embodiment, when the second information is a HARQ-ACK resource offset, if the DCI is used to schedule a PDSCH carrying an MTCH, because the UE does not need to acknowledge the received PDSCH, the base station does not need to indicate the HARQ-ACK resource offset in the DCI. Therefore, the first information may be indicated in the DCI when the second information is not indicated. Further, an indication indicating that configuration information of an MTCH changes is implemented in DCI without adding a bit to the DCI, so that control channel transmission performance is improved. If the DCI is used to schedule a user equipment-specific PDSCH, because the UE does not schedule an MTCH, the first information does not need to be indicated in the DCI; and because the UE needs to acknowledge the received PDSCH, the base station needs to include, in the DCI, information indicating the HARQ-ACK resource offset, so that the second information that requires acknowledgment can still be indicated in the DCI.

In a possible embodiment, when the second information is an NDI, if the DCI is used to schedule a PDSCH carrying an MTCH, because the base station does not need to indicate whether the PDSCH is newly transmitted or retransmitted, the base station does not need to indicate the NDI in the DCI. Therefore, the first information may be added to the DCI and indicated in the DCI when the second information is not indicated. Further, an indication indicating that configuration information of an MTCH changes is implemented in DCI without adding a bit to the DCI, so that control channel transmission performance is improved. If the DCI is used to schedule a user equipment-specific PDSCH, because the UE does not schedule an MTCH, the first information does not need to be indicated in the DCI; and because the base station needs to indicate whether the sent PDSCH is newly transmitted or retransmitted, the base station needs to include, in the DCI, information indicating the NDI.

In a possible embodiment, when the second information is TPC, if the DCI is used to schedule a PDSCH carrying an MTCH, because the UE does not need to acknowledge the received PDSCH, the base station does not need to indicate transmit power control of a PUCCH in the DCI. Therefore, the first information may be added to the DCI and indicated in the DCI when the second information is not indicated. Further, an indication indicating that configuration information of an MTCH changes is implemented in DCI without adding a bit to the DCI, so that control channel transmission performance is improved. If the DCI is used to schedule a user equipment-specific PDSCH, because the UE does not schedule an MTCH, the first information does not need to be indicated in the DCI; and because the UE needs to acknowledge the received PDSCH, the base station needs to include, in the DCI, information indicating the TPC.

In a possible embodiment, when the second information is a HARQ-ACK process number, if the DCI is used to schedule a PDSCH carrying an MTCH, because the UE does not need to acknowledge the received PDSCH and does not need to perform HARQ combination, the base station does not need to indicate the HARQ process number in the DCI. Therefore, the first information may be added to the DCI and indicated in the DCI when the second information is not indicated. Further, an indication indicating that configuration information of an MTCH changes is implemented in DCI without adding a bit to the DCI, so that control channel transmission performance is improved. If the DCI is used to schedule a user equipment-specific PDSCH, because the UE does not schedule an MTCH, the first information does not need to be indicated in the DCI; and because the UE needs to acknowledge the received PDSCH and perform HARQ combination, the base station needs to include, in the DCI, information indicating the HARQ process number.

In a possible embodiment, the first information and the second information in the foregoing examples may be indicated in the DCI by using different fields. The first field is used to indicate the first information, and the second field is used to indicate the second information. When the DCI is used to schedule a PDSCH carrying an MTCH, the DCI includes the first field and does not include the second field; or when the DCI is used to schedule a UE-specific PDSCH, the DCI includes the second field and does not include the first field.

Figure 3:
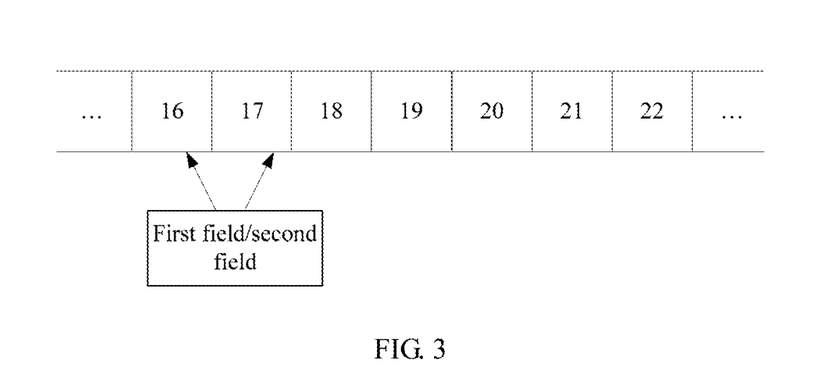
FIG. 3 is a diagram of an example of a bit position according to an embodiment of the present invention.

Optionally, a bit position, in the DCI, of a bit included in the first field is the same as a bit position, in the DCI, of a bit included in the second field. FIG. 3 is a diagram of an example of a bit position according to an embodiment of the present invention. A description is made by using, as an example, a case in which a size of the first information and a size of the second information each are 2 bits. Bit positions occupied by the first field or the second field in the DCI are a $16^{th}$ bit position and a $17^{th}$ bit position. When the DCI is used to schedule a PDSCH carrying an MTCH, the $16^{th}$ bit position and the $17^{th}$ bit position in the DCI are bit positions corresponding to the first information. When the DCI is used to schedule a UE-specific PDSCH, the $16^{th}$ bit position and the $17^{th}$ bit position in the DCI are bit positions corresponding to the second information. When different fields in the DCI are used to indicate the first information and the second information, a fixed bit position is used to write a bit included in the first field or a bit included in the second field, so that the UE can interpret the first information and the second information in the DCI, thereby improving interpretation efficiency.

In another possible embodiment, a same field in the DCI may be used to indicate the first information or the second information. Specifically, the DCI includes a fifth field. When the DCI is used to schedule a PDSCH carrying a multicast traffic channel, the fifth field is used to indicate the first information; or when the DCI is used to schedule a UE-specific PDSCH, the fifth field is used to indicate the second information; or when the DCI is used to schedule a PDSCH carrying a random access response message, a bit of the fifth field is a reserved bit.

Figure 4:
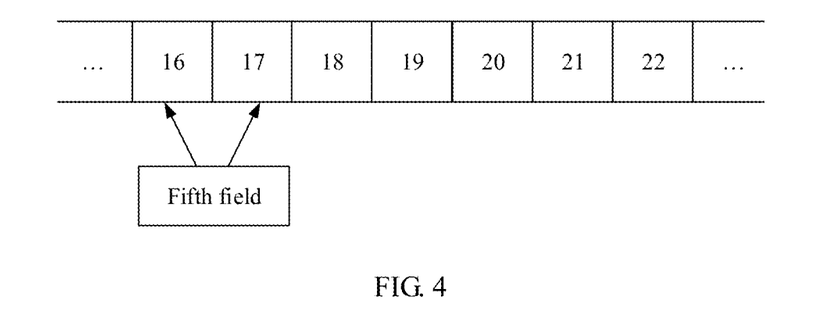
FIG. 4 is a diagram of another example of a bit position according to an embodiment of the present invention.

For example, FIG. 4 is a diagram of another example of a bit position according to an embodiment of the present invention. As shown in FIG. 4, a description is made by using, as an example, a case in which a size of the first information and a size of the second information each are 2 bits. Bit positions occupied by the fifth field in the DCI are a $16^{th}$ bit position and a $17^{th}$ bit position. When the DCI is used to schedule a PDSCH carrying an MTCH, the $16^{th}$ bit position and the $17^{th}$ bit position in the DCI are bit positions corresponding to the first information; or when the DCI is used to schedule a UE-specific PDSCH, the $16^{th}$ bit position and the $17^{th}$ bit position in the DCI are bit positions corresponding to the second information; or when the DCI is used to schedule a PDSCH carrying a random access response message, the $16^{th}$ bit position and the $17^{th}$ bit position in the DCI are positions of reserved bits. It can be learned that a field occupied by the first information is a field that indicates the second information, thereby avoiding an increase in bit overheads of the DCI, improving DCI transmission performance, and optimizing resource utilization efficiency.

102. The user equipment receives the DCI in the first DCI format.

Specifically, a DCI format used by the user equipment to receive the DCI is the same as a format used by the base station to transmit the DCI, and the first DCI format is not limited in this embodiment of the present invention.

Further, the user equipment may determine, by determining an RNTI used for scrambling cyclic redundancy code (CRC) of the received DCI, a PDSCH scheduled by using the DCI.

Optionally, after the user equipment receives the DCI, step 105 is performed. If the user equipment determines that the CRC of the received DCI is scrambled by using a first RNTI, the DCI is used to schedule a PDSCH carrying an MTCH, and the first information is indicated in the DCI and the second information is not indicated in the DCI. Alternatively, after the user equipment receives the DCI, step 106 is performed. If the user equipment determines that the CRC of the received DCI is scrambled by using a second RNTI, the DCI is used to schedule a user equipment-specific (UE-specific) PDSCH, and the first information is not indicated in the DCI and the second information is indicated in the DCI.

Optionally, when the user equipment determines that the CRC of the received DCI is scrambled by using a third RNTI, the DCI is used to schedule a PDSCH carrying a random access response message, and neither the first information nor the second information is indicated in the DCI.

For a case in which the DCI is used to schedule different PDSCHs, the base station has set a field included in the DCI, information indicated by the included field, and a bit position, in the DCI, of a bit included in the field, and the information may also be determined by the user equipment. Therefore, after the user equipment determines a PDSCH that the DCI is used to schedule, information indicated by the DCI may be determined based on the specified field included in the DCI corresponding to the PDSCH, the information indicated by the included field, and the bit position, in the DCI, of the bit included in the field.

Further, for the first information, the second information, the field indicating the first information, and the field indicating the second information, refer to content described on a base station side. Details are not described herein again.

For example, in the diagram of the example of the bit position shown in FIG. 4, the sizes of the first information and the second information each are 2 bits, and the bit positions occupied by the fifth field in the DCI are the $16^{th}$ bit position and the $17^{th}$ bit position. When the user equipment determines that the DCI is used to schedule a PDSCH carrying an MTCH, the user equipment may determine that the $16^{th}$ bit position and the $17^{th}$ bit position in the DCI indicate the first information, and obtain bit values from the 16$^{th}$ bit position and the 17$^{th}$ bit position in the DCI, to further determine the indicated first information. When the user equipment determines that the DCI is used to schedule a user equipment-specific PDSCH, the user equipment may determine that the 16$^{th}$ bit position and the 17$^{th}$ bit position in the DCI indicate the second information, and obtain bit values from the 16$^{th}$ bit position and the 17$^{th}$ bit position in the DCI, to further determine the indicated second information. When the user equipment determines that the DCI is used to schedule a PDSCH carrying a random access response message, the user equipment may determine that the 16$^{th}$ bit position and the 17$^{th}$ bit position are positions of reserved bits.

It should be noted that, in this embodiment of the present invention, the multicast traffic channel may be a single-carrier multicast control channel (SC-MCCH). This is not limited in this embodiment of the present invention.

In this embodiment of the present invention, the base station transmits the DCI in the first DCI format. When the DCI is used to schedule a PDSCH carrying an MTCH, the base station indicates, by using the first RNTI, that the DCI is used to schedule the PDSCH carrying the MTCH, and that the first information is indicated in the DCI and the second information is not indicated in the DCI. When the DCI is used to schedule a user equipment-specific (UE-specific) PDSCH, the base station indicates, by using the second RNTI, that the DCI is used to schedule the UE-specific PDSCH, and that the first information is not indicated in the DCI and the second information is indicated in the DCI. In this way, when the DCI is used to schedule different PDSCHs, information that needs to be indicated in the DCI is different from information that does not need to be indicated in the DCI. Therefore, a quantity of bits in the DCI that can still be used is determined by using the information that does not need to be indicated, and the corresponding quantity of bits are used to indicate the information that needs to be indicated, so that the information that needs to be indicated can be transmitted without increasing a quantity of bits, thereby improving control channel transmission performance.

Figure 5:
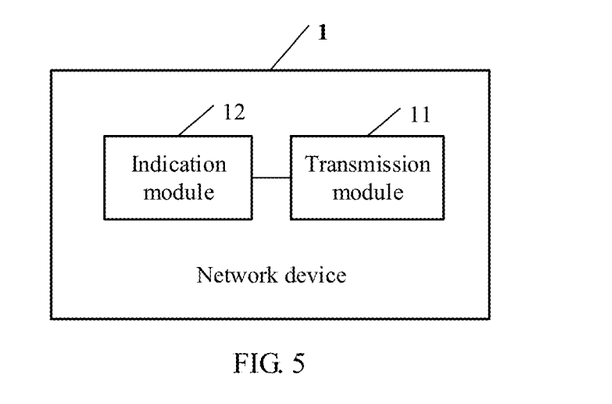
FIG. 5 is a schematic structural diagram of a network device according to an embodiment of the present invention.

FIG. 5 is a schematic structural diagram of a network device according to an embodiment of the present invention. The network device in this embodiment of the present invention may be the network device provided in any embodiment shown in FIG. 2 to FIG. 4. As shown in FIG. 5, the network device 1 in this embodiment of the present invention may include a transmission module 11 and an indication module 12.

The transmission module 11 is configured to transmit DCI in a first DCI format.

The indication module 12 is configured to: when the DCI is used to schedule a physical downlink shared channel (PDSCH) carrying a multicast traffic channel, indicate, by using a first radio network temporary identifier (RNTI), that the DCI is used to schedule the PDSCH carrying the multicast traffic channel, and that first information is indicated in the DCI and second information is not indicated in the DCI.

The indication module 12 is further configured to: when the DCI is used to schedule a user equipment-specific (UE-specific) PDSCH, indicate, by using a second RNTI, that the DCI is used to schedule the UE-specific PDSCH, and that the first information is not indicated in the DCI and the second information is indicated in the DCI.

In an optional embodiment, the indication module 12 is further configured to: when the DCI is used to schedule a PDSCH carrying a random access response message, indicate, by using a third RNTI, that the DCI is used to schedule the PDSCH carrying the random access response message, and that neither the first information nor the second information is indicated in the DCI.

In an optional embodiment, a size of the first information is 1 bit, and the first information is used to indicate whether a configuration of the multicast traffic channel changes in a next modification period; or a size of the first information is 1 bit, and the first information is used to indicate whether a new service starts on the multicast traffic channel in a next modification period; or the first information includes only third information and fourth information, a size of the third information is 1 bit, a size of the fourth information is 1 bit, the third information is used to indicate whether a configuration of the multicast traffic channel changes in a next modification period, and the fourth information is used to indicate whether a new service starts on the multicast traffic channel in the next modification period; or a size of the first information is 2 bits, and the 2 bits of the first information are used to jointly indicate whether a configuration of the multicast traffic channel changes in a next modification period, and whether a new service starts on the multicast traffic channel in the next modification period.

In an optional embodiment, the DCI includes a first field or a second field; and when the DCI is used to schedule a PDSCH carrying a multicast traffic channel, the DCI includes the first field and does not include the second field; or when the DCI is used to schedule a UE-specific PDSCH, the DCI includes the second field and does not include the first field, where the first field is used to indicate the first information, and the second field is used to indicate the second information.

In an optional embodiment, a bit position, in the DCI, of a bit included in the first field is the same as a bit position, in the DCI, of a bit included in the second field.

In an optional embodiment, when the first information includes only the third information and the fourth information, the first field includes a third field and a fourth field, where the third field is used to indicate the third information, and the fourth field is used to indicate the fourth information.

In an optional embodiment, the DCI includes a fifth field; and when the DCI is used to schedule a PDSCH carrying a multicast traffic channel, the fifth field is used to indicate the first information; or when the DCI is used to schedule a UE-specific PDSCH, the fifth field is used to indicate the second information; or when the DCI is used to schedule a PDSCH carrying a random access response message, a bit of the fifth field is a reserved bit.

In an optional embodiment, the second information is a hybrid automatic repeat request-acknowledgment resource offset (HARQ-ACK resource offset); or the second information is a new data indicator (NDI); or the second information is transmit power control (TPC); or the second information is a hybrid automatic repeat request process number (HARQ process number).

In an optional embodiment, the fifth field is a field used to indicate the second information.

Figure 6:
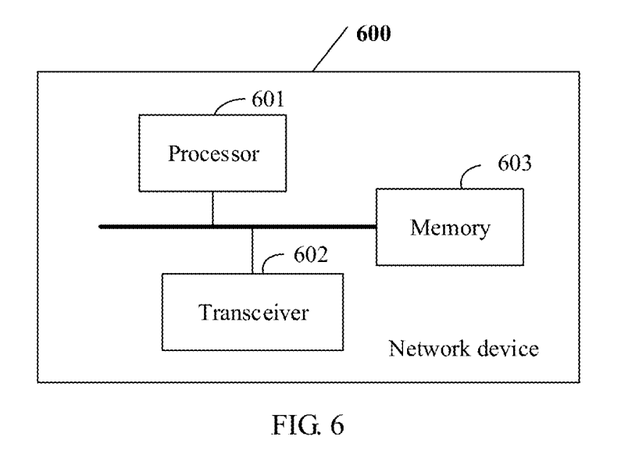
FIG. 6 is a schematic structural diagram of another network device according to an embodiment of the present invention.

The network device in the embodiment shown in FIG. 5 may be implemented by using a network device shown in FIG. 6. FIG. 6 is a schematic structural diagram of a network device according to an embodiment of the present invention. The network device 600 shown in FIG. 6 includes a processor 601 and a transceiver 602. The processor 601 is communicatively connected to the transceiver 602, for example, by using a bus. Optionally, the network device 600 may further include a memory 603. It should be noted that, in actual application, there is at least one transceiver 602, and a structure of the network device 600 does not constitute any limitation on this embodiment of the present invention.

The processor 601 is applied to this embodiment of the present invention, and is configured to implement functions of the indication module 12 shown in FIG. 5. The transceiver 602 is applied to this embodiment of the present invention, and is configured to implement functions of the transmission module 11 shown in FIG. 5. Optionally, the transceiver 602 includes a receiver and a transmitter.

The processor 601 may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processor 601 may implement or execute various examples of logical blocks, modules, and circuits described with reference to content disclosed in this application. Alternatively, the processor 601 may be a combination of processors implementing a computing function, for example, a combination of one or more microprocessors, or a combination of a DSP and a microprocessor.

The memory 603 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or other compact disc storage, optical disc storage (including a compact disc, a laser disc, an optical disc, a digital versatile disc, a Blu-ray disc, or the like), a disk storage medium or another magnetic storage device, or any other computer-accessible medium that can be used to carry or store expected program code in an instruction or data structure form. However, this is not limited herein.

Optionally, the memory 603 is configured to store application program code used for executing the solutions of this application, and the processor 601 controls the execution. The processor 601 is configured to execute the application program code stored in the memory 603, to implement actions of the network device provided in any embodiment shown in FIG. 2 to FIG. 4.

An embodiment of the present invention further provides a computer storage medium, configured to store computer software instructions used by the foregoing network device, where the computer software instructions include a program designed for the network device to execute the foregoing embodiments.

Figure 7:
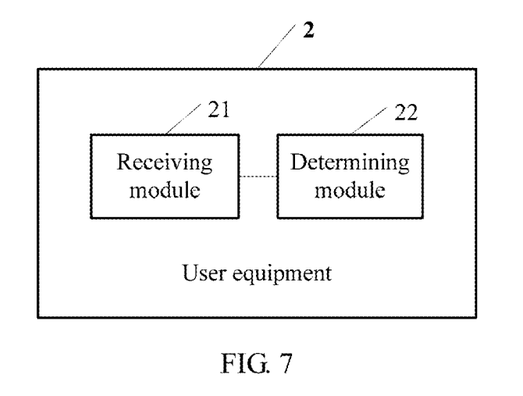
FIG. 7 is a schematic structural diagram of user equipment according to an embodiment of the present invention.

FIG. 7 is a schematic structural diagram of user equipment according to an embodiment of the present invention. The user equipment in this embodiment of the present invention may be the user equipment provided in any embodiment shown in FIG. 2 to FIG. 4. As shown in FIG. 7, the user equipment 2 in this embodiment of the present invention may include a receiving module 21 and a determining module 22.

The receiving module 21 is configured to receive DCI in a first DCI format.

The determining module 22 is configured to: when a cyclic redundancy code (CRC) of the received DCI is scrambled by using a first radio network temporary identifier (RNTI), determine that the DCI is used to schedule a physical downlink shared channel (PDSCH) carrying a multicast traffic channel, and that first information is indicated in the DCI and second information is not indicated in the DCI.

The determining module 22 is further configured to: when the CRC of the received DCI is scrambled by using a second RNTI, determine that the DCI is used to schedule a user equipment-specific (UE-specific) PDSCH, and that the first information is not indicated in the DCI and the second information is indicated in the DCI.

In an optional embodiment, the determining module 22 is further configured to: when the CRC of the received DCI is scrambled by using a third RNTI, determine that the DCI is used to schedule a PDSCH carrying a random access response message, and that neither the first information nor the second information is indicated in the DCI.

In an optional embodiment, a size of the first information is 1 bit, and the first information is used to indicate whether a configuration of the multicast traffic channel changes in a next modification period; or a size of the first information is 1 bit, and the first information is used to indicate whether a new service starts on the multicast traffic channel in a next modification period; or the first information includes only third information and fourth information, a size of the third information is 1 bit, a size of the fourth information is 1 bit, the third information is used to indicate whether a configuration of the multicast traffic channel changes in a next modification period, and the fourth information is used to indicate whether a new service starts on the multicast traffic channel in the next modification period; or a size of the first information is 2 bits, and the 2 bits of the first information are used to jointly indicate whether a configuration of the multicast traffic channel changes in a next modification period, and whether a new service starts on the multicast traffic channel in the next modification period.

In an optional embodiment, the DCI includes a first field or a second field; and when the DCI is used to schedule a PDSCH carrying a multicast traffic channel, the DCI includes the first field and does not include the second field; or when the DCI is used to schedule a UE-specific PDSCH, the DCI includes the second field and does not include the first field, where the first field is used to indicate the first information, and the second field is used to indicate the second information.

In an optional embodiment, a bit position, in the DCI, of a bit included in the first field is the same as a bit position, in the DCI, of a bit included in the second field.

In an optional embodiment, when the first information includes only the third information and the fourth information, the first field includes a third field and a fourth field, where the third field is used to indicate the third information, and the fourth field is used to indicate the fourth information.

In an optional embodiment, the DCI includes a fifth field; and when the DCI is used to schedule a PDSCH carrying a multicast traffic channel, the fifth field is used to indicate the first information; or when the DCI is used to schedule a UE-specific PDSCH, the fifth field is used to indicate the second information; or when the DCI is used to schedule a PDSCH carrying a random access response message, a bit of the fifth field is a reserved bit.

In an optional embodiment, the second information is a hybrid automatic repeat request-acknowledgment resource offset (HARQ-ACK resource offset); or the second information is a new data indicator (NDI); or the second information is transmit power control (TPC); or the second information is a hybrid automatic repeat request process number (HARQ process number).

In an optional embodiment, the fifth field is a field used to indicate the second information.

Figure 8:
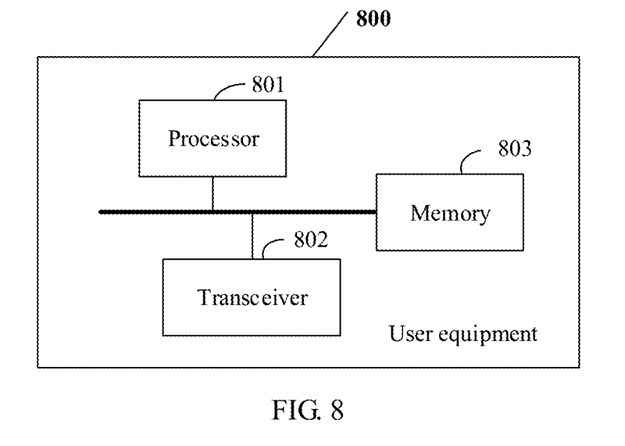
FIG. 8 is a schematic structural diagram of another user equipment according to an embodiment of the present invention.

The user equipment in the embodiment shown in FIG. 7 may be implemented by using user equipment shown in FIG. 8. FIG. 8 is a schematic structural diagram of user equipment according to an embodiment of the present invention. The user equipment 800 shown in FIG. 8 includes a processor 801 and a transceiver 802. The processor 801 is communicatively connected to the transceiver 802, for example, by using a bus. Optionally, the user equipment 800 may further include a memory 803. It should be noted that, in actual application, there is at least one transceiver 802, and a structure of the user equipment 800 does not constitute any limitation on this embodiment of the present invention.

The processor 801 is applied to this embodiment of the present invention, and is configured to implement functions of the determining module 22 shown in FIG. 7. The transceiver 802 is applied to this embodiment of the present invention, and is configured to implement functions of the receiving module 21 shown in FIG. 7. Optionally, the transceiver 802 includes a receiver and a transmitter.

The processor 801 may be a CPU, a general purpose processor, a DSP, an ASIC, an FPGA or another programmable logic device, a transistor logic device, a hardware component, or any combination thereof. The processor 801 may implement or execute various examples of logical blocks, modules, and circuits described with reference to content disclosed in this application. Alternatively, the processor 801 may be a combination of processors implementing a computing function, for example, a combination of one or more microprocessors, or a combination of a DSP and a microprocessor.

The memory 803 may be a ROM or another type of static storage device that can store static information and instructions, or a RAM or another type of dynamic storage device that can store information and instructions; or may be an EEPROM, a CD-ROM or other compact disc storage, optical disc storage (including a compact disc, a laser disc, an optical disc, a digital versatile disc, a Blu-ray disc, or the like), a disk storage medium or another magnetic storage device, or any other computer-accessible medium that can be used to carry or store expected program code in an instruction or data structure form. However, this is not limited herein.

Optionally, the memory 803 is configured to store application program code used for executing the solutions of this application, and the processor 801 controls the execution. The processor 801 is configured to execute the application program code stored in the memory 803, to implement actions of the user equipment provided in any embodiment shown in FIG. 2 to FIG. 4.

An embodiment of the present invention further provides a computer storage medium, configured to store computer software instructions used by the foregoing user equipment, where the computer software instructions include a program designed for the user equipment to execute the foregoing aspects.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The foregoing storage medium includes: any medium that can store program code, such as a ROM, a random access memory RAM, a magnetic disk, or an optical disc.

Although this application is described with reference to various embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of "a plurality of". A single processor or another unit may implement several functions enumerated in the claims. Some measures are recorded in dependent claims that are different from each other, but this does not mean that these measures cannot be combined to produce a better effect.

To enable a person skilled in the art to better understand the technical solutions in this application, the foregoing has described the technical solutions in the embodiments of this application with reference to the accompanying drawings in the embodiments of this application. In the specification, claims, and accompanying drawings of this application, the terms "first", "second", "third", "fourth", and the like are intended to distinguish between different objects but do not indicate a particular order. In addition, the terms "including", "having", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

A person skilled in the art should understand that the embodiments of this application may be provided as a method, an apparatus (device), or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, or the like) that include computer usable program code. The computer program is stored/distributed in a proper medium and is provided as or used as a part of hardware together with another hardware, or may also use another distribution form, for example, by using the Internet or another wired or wireless telecommunications system.

This application is described with reference to the flowcharts and/or block diagrams of the method, the apparatus (device), and the computer program product in the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Although this application is described with reference to specific features and the embodiments thereof, obviously, various modifications and combinations may be made to this application without departing from the spirit and scope of this application. Correspondingly, the specification and accompanying drawings are merely an example of description of this application defined by the accompanying claims, and is considered as any of or all modifications, variations, combinations or equivalents that cover the scope of this application. Obviously, a person skilled in the art may make various modifications and variations to this application without departing from the spirit and scope of this application. This application is intended to cover these modifications and variations of this application provided that they fall within the scope of the claims in this application and their equivalent technologies.

What is claimed is:

1. A downlink control information (DCI) transmission method, comprising:
   receiving, by user equipment, DCI in a first DCI format;
   determining, by the user equipment, based on whether a cyclic redundancy code (CRC) of the DCI is scrambled by a first radio network temporary identifier (RNTI) or a second RNTI, whether a bit on a first bit position of the DCI indicates one of the following:
   whether a new service starts on a multicast traffic channel in a next modification period,
   or
   a hybrid automatic repeat request (HARQ) process number, wherein the determining comprises at least one of the following:
   determining that the bit on the first bit position of the DCI indicates whether the new service starts on the multicast traffic channel in the next modification period in response to the DCI being scrambled by the first RNTI, or
   determining that the bit on the first bit position of the DCI indicates the HARQ process number in response to the DCI being scrambled by the second RNTI; and
   determining, by the user equipment, one of the following:
   that a bit on a second bit position of the DCI is a new data indicator (NDI) in response to the CRC of the DCI being scrambled by the second RNTI; or
   that the bit on the second bit position of the DCI indicates whether a configuration of a multicast traffic channel changes in a next modification period in response to the CRC of the DCI being scrambled by the first RNTI.

2. An apparatus, comprising:
   a memory storing program instructions; and
   a processor coupled to the memory, wherein the program instructions, when executed by the processor, cause the apparatus to:
   receive downlink control information (DCI) in a first DCI format; and
   determine, based on whether a cyclic redundancy code (CRC) of the DCI is scrambled by a first radio network temporary identifier (RNTI) or a second RNTI, whether a bit on a first bit position of the DCI indicates one of the following:
   whether a new service starts on a multicast traffic channel in a next modification period,
   or
   a hybrid automatic repeat request (HARQ) process number, wherein the determining comprises at least one of the following:
   determining that the bit on the first bit position of the DCI indicates whether the new service starts on the multicast traffic channel in the next modification period in response to the DCI being scrambled by the first RNTI, or
   determining that the bit on the first bit position of the DCI indicates the HARQ process number in response to the DCI being scrambled by the second RNTI; and
   determine one of the following:
   that a bit on a second bit position of the DCI is a new data indicator (NDI) in response to the CRC of the DCI being scrambled by the second RNTI; or
   that the bit on the second bit position of the DCI indicates whether a configuration of a multicast traffic channel changes in a next modification period in response to the CRC of the DCI being scrambled by the first RNTI.

* * * * *